United States Patent
Van den Bergh et al.

(10) Patent No.: US 6,998,159 B2
(45) Date of Patent: Feb. 14, 2006

(54) PACKED STORAGE PHOSPHOR SCREENS OR PANELS

(75) Inventors: Rudy Van den Bergh, Lint (BE); Heinz Backhaus, Schrobenhausen (DE); Ludo Neyens, Kontich (BE)

(73) Assignee: Agfa-Gevaert, Mortsel (BE)

( * ) Notice: Subject to any disclaimer, the term of this patent is extended or adjusted under 35 U.S.C. 154(b) by 363 days.

(21) Appl. No.: 10/617,648

(22) Filed: Jul. 11, 2003

(65) Prior Publication Data

US 2004/0070328 A1    Apr. 15, 2004

Related U.S. Application Data

(60) Provisional application No. 60/403,025, filed on Aug. 13, 2002.

(30) Foreign Application Priority Data

Jul. 30, 2002   (EP) .................................... 02102069

(51) Int. Cl.
 *B29D 22/00*   (2006.01)
(52) U.S. Cl. ..................... 428/35.8; 206/455
(58) Field of Classification Search ................ 206/455, 206/484, 484.1; 428/34.1, 34.3, 34.6, 35.2, 428/35.3, 35.7, 35.8
See application file for complete search history.

(56) References Cited

U.S. PATENT DOCUMENTS

| | | | |
|---|---|---|---|
| 4,537,306 A | 8/1985 | Muylle ...................... 206/455 |
| 6,312,828 B1 * | 11/2001 | Akao ......................... 428/516 |
| 6,732,493 B1 * | 5/2004 | Kaschel ....................... 53/441 |
| 6,811,886 B1 * | 11/2004 | Speith-Herfurth et al. .. 428/516 |
| 6,863,964 B1 * | 3/2005 | Migliorini et al. .......... 428/213 |
| 6,893,672 B1 * | 5/2005 | Ingraham .................... 426/107 |
| 2002/0066868 A1 | 6/2002 | Shoji et al. ............... 250/484.4 |

FOREIGN PATENT DOCUMENTS

EP          0 603 431          6/1994

* cited by examiner

*Primary Examiner*—Shian T. Luong
(74) *Attorney, Agent, or Firm*—Joseph T. Guy; Nexsen Pruet Law Firm

(57) ABSTRACT

A packed phosphor screen or panel consisting of at least one flat square or rectangular screen or panel, optionally packed apart in a wrapper foil, and a sealed package, wherein said package is layered in form of an asymmetrical barrier layer foil, said foil comprising an inner flexible thermoplastic polymer layer and an outer polymer layer in adhesive contact with an aluminum layer situated inbetween said inner flexible thermoplastic polymer layer and said outer polymer layer, wherein said foil is characterized by adhesive forces, between said outer polymer layer and said aluminum layer, of more than 2.5 N/mm$^2$ following DIN 53 357, by a permeation to water vapor of less than 0.01 g per sq.m. in an environment having a temperature of 23° C. and a relative humidity of 75% RV for 24 hours following DIN 53 122, and by a permeation of less than 0.01 cm$^3$ per sq.m. per 24 hours and per bar for each of oxygen, carbon dioxide and nitrogen following DIN 53 380 (ISO 2556, ASTM D 1434).

55 Claims, 2 Drawing Sheets

PACKED STORAGE PHOSPHOR SCREENS OR PANELS

The application claims the benefit of U.S. Provisional Application No. 60/403,025 filed Aug. 13, 2002.

FIELD OF THE INVENTION

The present invention relates to packed storage phosphor screens or panels and to use of that package for packaging raw materials, required to build up the said screens or panels, thereby providing an excellent protection against at least moisture and oxygen.

BACKGROUND OF THE INVENTION

It is well-known that quite a lot of raw materials as e.g. phosphors, required in order to build up intensifying or storage phosphor plates, have a fair to high sensitivity for moisture, i.e. they are hygroscopic to some extent and tend to absorb water. Absorption of even small amounts of water rapidly reduces the efficiency of the phosphors to vanishingly small values.

Most of those plates or panels coated with phosphors containing halide suffer from this draw-back. Hygroscopic phosphors used in intensifying screens are e.g. BaFCl:Eu, BaFBr:Eu, LaOBr:Tm and GdOBr:Tm. Examples of hygroscopic X-ray storage phosphor that can be used in computer radiography systems are: BaFBr:Eu, BaFI:Eu, LaOBr, (Ba,Sr)F(Br,I):Eu, RbBr:Tl, CsBr:Eu, CsCl:Eu and RbBr:Eu. In order to make these hygroscopic phosphors suitable for use it is necessary to protect the phosphor particles from moisture.

One way to protect the individual phosphor particles is by coating them with a substance such as e.g. $SiO_2$ or $TiO_2$ which prevents penetration of moisture as has been disclosed in EP-A's 0 097 377, 0 476 206 and 0 928 826; in GB-A 2,255,100; in U.S. Pat. Nos. 5,196,229 and 6,177,030 and in WO 00/22065. In the alternative said phosphor particles are coated with a UV-absorbing transparent synthetic resin to make them resistant to moisture, oxidation and ultraviolet irradiation as has been disclosed in JP-A 60-177090.

However, it is very difficult to apply a defect-free coating to particles having an average particle size of 1 to 10 $\mu$m. Moreover if the coating on the phosphor particles is too thick the amount of phosphor in a layer should be reduced in order to avoid thickening of the coated phosphor layer. As this leads to reduced X-ray absorption by the phosphor screen or panel no acceptable solution can be expected from that measure so that applying a coating around the individual phosphor particles is, therefore, not always desirable.

Another way to stabilize a phosphor screen containing a hygroscopic phosphor is by adding a stabilising compound to the phosphor layer as has been disclosed e.g. in EP-A's 0 234 385, 0 506 585, 0 544 921 and 0 747 908 and in U.S. Pat. Nos. 5,639,400 and 5,641,967. This compound will either react with the absorbed water, thereby preventing reaction of the phosphor particles with water, or it will react with the breakdown products which are formed by reaction of the phosphor particles with moisture, thereby preventing discoloration of the screen. Discoloration is well-known as a common cause of deterioration of screen efficiency. It is clear that stabilising substances thus have a finite working period. Since water is attracted continuously the amount of unreacted stabilising compound diminishes with time. After a certain period of time, no unreacted stabilising material will be left and the phosphor screen will undergo delayed deterioration.

Stabilising compounds are known as additives to powder phosphor screens, in which the active layer is produced by coating a lacquer consisting of phosphor particles, a binder and a solvent to a substrate. Some phosphor screens are produced by means of physical vapor deposition in a vacuum chamber, although it is not obvious to introduce a stabilising compound into a vapor deposited phosphor layer. Yellowing of phosphors having iodine can be prevented by diverse stabilising compounds as has been disclosed e.g. in EP-A 0 234 385, in U.S. Pat. No. 5,641,967 and in JP-A 62-247300 63-193096, 63-193097, 63-193098 and 63-193099 and in JP-B 94-031909.

A better way in order to protect a phosphor screen is related with the application of a protective coating or coatings as has been described e.g. in EP-A's 0 209 358, 0 348 172, 0 654 794 and in U.S. Pat. No. 4,603,253, wherein said coatings have been applied on top of the active layer containing the phosphor particles, also called "phosphor layer". Protective layers may be applied by several techniques. A less preferred way is to coat a polymer solution onto the phosphor layer and to subsequently evaporate the solvent by heating. A disadvantage of this technique namely is that the solvent my cause swelling and damaging of the phosphor layer. A more preferred way is to laminate a film onto the phosphor layer. Another preferred way is to apply a monomer lacquer onto the phosphor layer by e.g. screen printing and to cross-link the monomers by ultraviolet or electron beam irradiation, thus forming a continuous topcoat layer free of defects as has been described e.g. in U.S. Pat. Nos. 5,520,965 and 5,607,774.

All techniques mentioned thus far however suffer from the draw-back that the edges of the phosphor layer remain unprotected. Hence water may penetrate the phosphor layer from the side and degradation and discoloration may start from the edges, thereby moving inwards further.

An edge protection layer may further be applied separately as has been disclosed e.g. in EP-A's 0 095 188 and 0 576 054, as well as in JP-A 63-193098 and in JP-B 94-31914. This requires-an additional step in the manufacturing process. In addition, adhesion between the protective layer and the edge enhancing layer is not perfect, which makes the edge enhancement layer vulnerable. Upon use of the screen, the edge enhancement layer is damaged and screen degradation at the edges can proceed locally again.

Intensive use of screens or panels showing no loss of image quality is required over a period of 3 years, and, more preferably, over a period of 5 years, during which about at least 10,000 cycles should have been run with one and same screen.

A solution has been found in EP-A's 1 286 362 and 1 286 365 in order to overcome the problems as set forth, more particularly with respect to moisture sensitivity, by applying a protective layer over the phosphor layer by the method of chemical vapor deposition (further in the text indicated as "CVD") in order to uniformly cover surface of the panel, so that the screen can be completely enveloped in a protective coating that extends seemlessly from the top of the screen, over the edges onto the back of the screen, thereby preventing moisture penetration, both at the top and at the edges. In a preferred embodiment thereof the phosphor screen in said EP-A's is a needle storage phosphor screen, composed of a $CsX:Eu^{2+}$ storage phosphor, X being selected from the group of halides consisting of Br and Cl, and the moisture proof protective layer is a "parylene" layer, "parylene" being a generic name for thermoplastic polymers and copolymers based on p-xylylene and substituted p-xylylene monomers.

However the problem remains stringent, depending upon local climate environment, when using and storing the panels over a long period of time as moisture and oxygen are invasive compounds, able to deteriorate the excellent properties of the storage panels on the long term as set forth hereinbefore.

OBJECTS OF THE INVENTION

Object of the present invention, in one embodiment, is to provide a packaging material for phosphors as raw materials in order to build up a phosphor panel.

It is another object to provide packed phosphor panels, coated with phosphor layers.

More preferably it is an object to provide packed storage phosphor panels, and even more preferred it is an object to provide storage phosphor panels coated with needle-shaped phosphors, perfectly protected against, at least, oxygen and moisture.

It is still another object to provide this protection for the used phosphor panels, not only directly after manufacturing, thus before use; but also inbetween regular service terms, as e.g. in hospitals, and against dust or dirt, as e.g. in extremely severe circumstances, like in a battlefield or in non-destructive testing applications while e.g. examining pipelines, aircrafts and related test materials.

Another object within the same scope has been the development of a cheaper and ecologically less environment loading package.

Other objects will become apparent from the summary, the description and the claims as set out hereinafter.

SUMMARY OF THE INVENTION

The object of the present invention to provide packed, raw materials for building up phosphor screens and the built up phosphor screens, thus protected by a suitable packaging material, has been realized by providing a packed material as disclosed in the following detailed description and in the claims.

More preferably, storage or stimulable phosphor panels, more particularly those screens coated with needle-shaped phosphors as described hereinbefore are envisaged to be suitably packed, thus protected against, at least, moisture and oxygen.

Further specific features for preferred embodiments of the invention are set out in the dependent claims.

Other advantages and embodiments of the present invention will become apparent from the following description.

Figure 1:
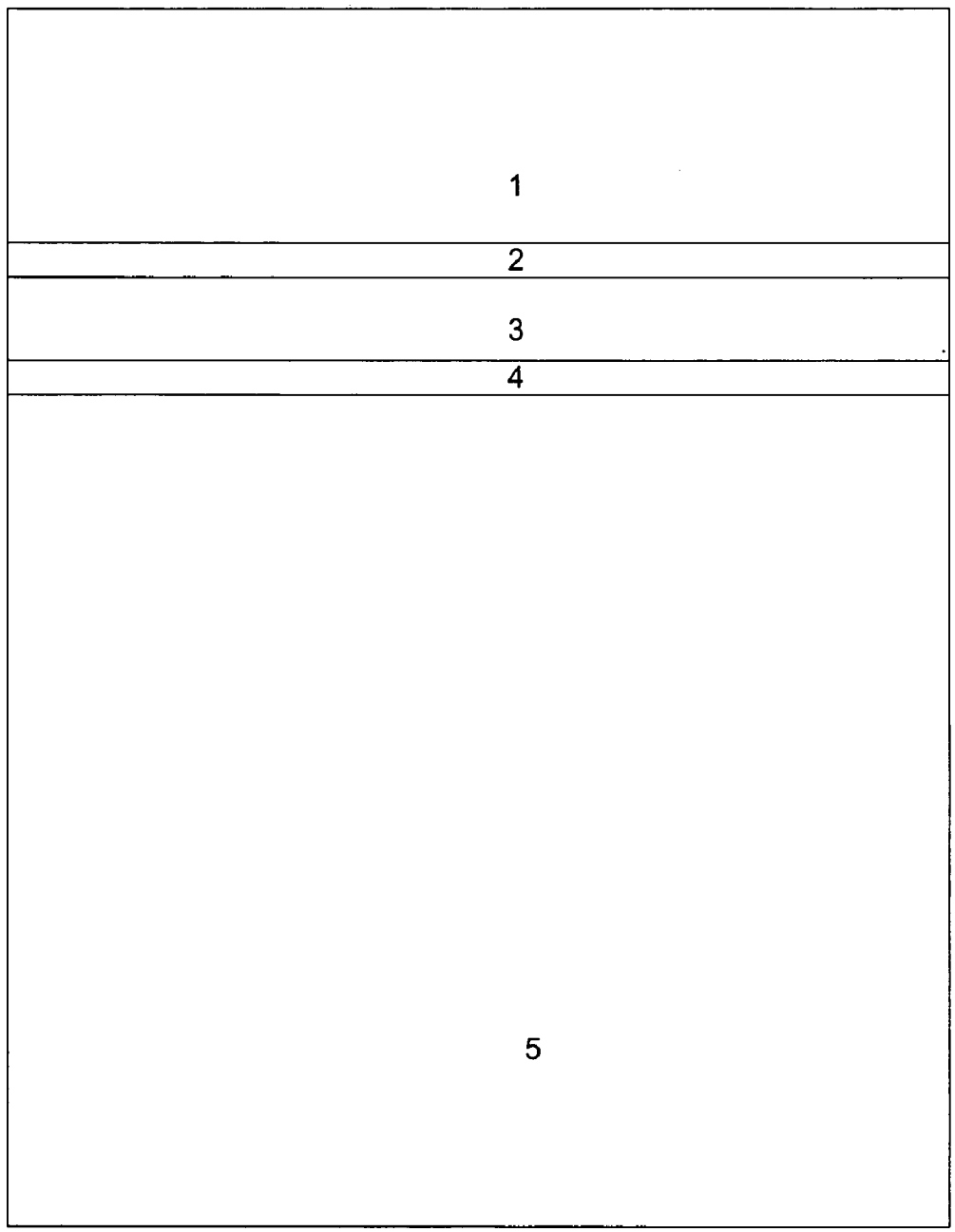
FIG. 1 shows a preferred layer arrangement of a protecting package foil particularly suitable for use for the packed material according to the present invention, numbers of the consecutive layers in FIG. 1 corresponding with
a metallized transparent polypropylene layer (1);
an adhesive layer (2);
an aluminum layer (3);
an adhesive layer (4);
a white opaque polyethylene layer (5).

Further explanation thereof is found in the description and in the Examples hereinafter.

DETAILED DESCRIPTION OF THE INVENTION

According to the present invention an air-tight or hermetically packed phosphor screen or panel has thus been disclosed, said packed phosphor screen or panel consisting of at least one (flat, square or rectangular) screen or panel, optionally packed apart in a wrapper foil, and a sealed package, wherein said package is layered in form of an asymmetrical barrier layer foil, said foil comprising an inner flexible thermoplastic polymer layer and an outer polymer layer in adhesive contact with an aluminum layer situated inbetween both layers, optionally having another polymer layer inbetween said aluminum layer and said inner flexible thermoplastic polymer layer, wherein said foil is characterized by adhesive forces, between said outer polymer layer and said aluminum layer of more than 2.5 N/mm$^2$ following DIN 53 357, a permeation to water vapor of less than 0.01 g per sq.m. in an environment having a temperature of 23° C. and a relative humidity of 75% RV for 24 hours, following DIN 53 122, and by a permeation of less than 0.01 cm$^3$ per sq.m. per 24 hours and per bar for each of oxygen, carbon dioxide and nitrogen following DIN 53 380 (ISO 2556, ASTM D 1434).

The package for phosphor screens which has been developed comprises one or more phosphor screen(s) or panel(s) which is(are) composed of a supported or self supporting screen or panel, wherein the phosphor containing layers are essentially covered with a protective coating and wherein said package is characterized by presence of a foil which is, as a whole, light-opaque and air-tight in that it is permeable at a temperature of 23° C. and a relative humidity of 75% by air, composed of compounds selected from the group consisting of oxygen, nitrogen and carbon dioxyde, in a restricted amount of up to less than 0.01 cm$^3$ per sq.m., per 24 hours and per bar, determined following DIN 53 380 (ISO 2556, ASTM D 1434) and by moisture in an amount of up to less than 0.01 g of water per sq.m. and per 24 hours determined following DIN 53 122.

In a preferred embodiment according to the present invention said outer polymer layer is a metallized polymer layer or a polyester layer. Even more preferred said outer metallized polymer layer is a polypropylene layer. Thicknesses of said outer polymer layers are in the range from 15 μm to 25 μm in case of said polypropylene layer and in the range from 10 μm to 15 μm in case of said polyester layer.

As already set forth hereinbefore in one embodiment said foil comprises an inner flexible thermoplastic polymer layer in adhesive contact with an aluminum layer, wherein said foil is characterized by an adhesive force, measured following DIN 53 357, of more than 2.5 N/mm$^2$, and more preferably of more than 5 N/mm$^2$, between said thermoplastic layer and said aluminum layer.

In another embodiment another polymer layer inbetween said aluminum layer and said inner flexible thermoplastic polymer layer is present, preferably being a (stretched) polyamide layer. In that case said polyamide layer has a thickness in the range from 10 μm to 20 μm and an adhesive layer is present between said polyamide layer and the aluminum layer at one side, and between the said polyamide layer and the innermost flexible thermoplastic layer at the other side. In a preferred embodiment resistance to piercing should be at least 30 N for the whole layer arrangement as set forth in the present embodiment.

According to the present invention said inner flexible thermoplastic polymer layer in the packaging foil is composed of polyethylene, and more preferably low density polyethylene. Thicknesses of the inner polyethylene layers are in the range from 50 μm to 100 μm, and, more preferably from 70 μm to 90 μm. Said low density polyethylene (called "LDPE") is preferred instead of high-density polyethylene (HDPE) because HDPE is much too inelastic and is lacking in heat sealability. Otherwise the various low density polyethylenes, e.g. low-density polyethylene (LDPE), linear low-density polyethylene (LLDPE), ultra low-density polyethylene (ULDPE), etc., in that order, do not possess sufficient elastic recovery, as the wrapper foil retains impressions or dents caused by handling of packaged screen panels. In order to solve that problem of damaging the inner polymeric foil and, as a consequence, in order to avoid exceeding the values set forth as an acceptable limit of oxygen and moisture penetration, it is recommended to choose the composition of the thermoplastic inner layer in order to have an excellent compromise between mechanical properties related with damaging of inner layer (as e.g. piercing) and physical properties related with permeability of the said inner layer. So it is recommended to have a composition wherein the ratio by weight of LLDPE and LDPE is exceeding 2:1 up to a ratio of about 7:3. So the packaging should more particularly be strong enough to resist damaging in the work field, e.g., as otherwise the flat needle image storage panels would already show corrosion before use, more particularly due to presence of humidity upon bad storage conditions in damaged packages.

With respect thereto the asymmetric layer arrangement of the package of the packed screen(s) or panel(s) according to the present invention should have a thickness ratio of said inner flexible thermoplastic layer to said outer polymer layer of at least 3:1. The said ratio may even be more than 7:1.

Low moisture-permeable film used in the layer arrangement of the packaging foil of the packed screens according to the present invention may include films obtained by laminating resins of fluorinated resins such as polytetrafluoroethylene and polytrifluoroethylene, chlorinated rubber, polyvinylidene chloride, a copolymer of vinylidene chloride and acrylonitrile, polyethylene and polypropylene, as well as thermoplastic polymers and copolymers based on p-xylylene and substituted p-xylylene monomers already mentioned above as preferred moisture resisting protective outermost layer of moisture-sensitive storage phosphor screens or panels. As moisture should be avoided it is recommended, upon storage, to have the flat panel or panels stored in a foil in form of a closed pouch instead of a loose wrapper, or to have the foil in form of a pouch by thermosealing two sheets of said foil material, wherein said two (equally sized) sheets (in form of a square or a rectangle, depending on the form of the storage phosphor screens or panels) are brought into contact with each other along the inner flexible thermoplastic polymer layers.

Thermosealing preferably proceeds in order to result in a package in form of a pouch having at least three thermosealed sides, so that the screen(s) or panel(s) can be put in, in order to get a packed screen or panel, which, according to the present invention, has at least three thermosealed sides. In a preferred embodiment according to the present invention, all sides are thermosealed, so that the objects are optimally attained.

The packed storage phosphor screens or panels are closed air-tight, although, in principle, one side can be left resealable, e.g. by providing said one side with a trace of glue, or, in the alternative, a velcro strip, on opposite sites at both sheets, wherein said resealable side is closed again by application of pressure, e.g. by simple rubbing over that side with a finger. It may be advisable to have such a resealable package, e.g. when the panels are not in use for some time and when they should be protected against atmospheric environmental factors, more particularly against moisture and oxygen as envisaged in the present invention. So according to the present invention a packed screen or panel is provided, wherein said package has at least one resealable side. In case of resealable packages it is even more recommended to have two sheets of the asymmetrical foils as defined above, differing in surface area, in that at the one resealable side a flange is present, wherein said flange is fold over the non-thermosealed side and wherein said flange, at the inner thermoplastic polymer layer, is provided with a velcro strip as well as at its counterpart on the corresponding side of the outer polymer layer, after having bended the flange over the rim of the non-thermosealed side. It should be recommended in that case, in order to provide a suitable protection against oxygen and moisture, to provide both inner sides at the non-thermosealed side of the package with the same means as described hereinbefore (glue or velcro strips at the corresponding sites at the opening of the pouch thus formed).

When the packed storage phosphor screens according to the present invention are stored in a pouch comprising a thermoplastic polymer foil defining the interior space thereof for receiving one or more storage panels and wherein the pouch has an opening into the interior space, a flange around the opening and sealing means extending continuously around the entire surface of the flange and continuously along the lower surface of the lid flange for sealing the lid flange and flange to the top surface of the backing sheet; and wherein the central area of the lid is spaced from the top surface of the backing sheet; it is understood that sealing means as applied are able to retain vapor and gases from coming inside the interior surface.

If a package contains more than one screen it is recommended that there is no contact between two screens in order to avoid any damages due to said contact (e.g. by rubbing) while being packed or while being taken out of the pouch. According to the present invention packed screens or panels are provided in one package, wherein said screens are all packed apart in a polymeric wrapper foil, wound around said screens or panels at least composed of a layer of thermoplastic material, more preferably a polyethylene wrapper, or wherein, in the alternative wrappers are present around those screens, selected in order to have no direct contact between outermost layers of said screens. So according to the present invention a packed screen or panel is provided, wherein at least one screen or panel is present, optionally packed apart in a polymeric sheet wrapper. E.g. in case of three screens present in a package as set forth it is recommended to have a wrapper around the panel, inbetween the two other screens. In another embodiment more than one flat panel may be stored in a package of packed screens according to the present invention. Alternatively an aluminum foil or sheet, a cardboard or a plastic sheet may further be placed inbetween piled up storage panels, packed together in a foil wrapper as described above. Instead of an electroconductive aluminum foil a thin (antistatic) cloth, paper or folder may alternatively be placed between the panels and the thermoplastic easy peel resin layer in order to avoid sparks (due to electrostatic discharge) at the moment that the panels are individually removed from the package.

In contrast to a resealable pouch with at least one screen or panel inside as described above the package of thermosealed packed screens (thermosealed on the four sides of the two foils in contact, e.g. by thermosealing the fourth side after have been put the sceen or screens in the pouch already thermosealed at three sides thereof) should be opened in a "destructive" way. In order to avoid additional use of any expedient like an knife or scissors, an easy way to open a completely thermosealed pouch, tearing open the pouch is most likely.

Accordingly the present invention provides a packed screen or panel wherein at least one of said thermosealed sides has a notch at its rim. In favor of providing handy opening of the package as set forth for such a packed screen or panel, two notches at opposite sides in the respective rims thereof are particularly preferred.

In case a completely thermosealed package it is recommended to have only one screen or panel in the said package.

As in that case the package has been teared it is not suitable for further use. Therefore a package in form of a non-destructively or resealably openable pouch is more particularly recommended in order to store the storage phosphor screen or panel temporarily and to protect it against environmental attack of oxygen, moisture and dust or other impurities.

When sealed in such a way it is important to have an indication from what site the package may be opened. So it is preferred to open such a package by tearing it from a site at the heat sealed edges wherein at least one notch is present, and, more preferably, wherein two notches are present in order to open the package and in order to remove at most one side thereof, thus providing removal of the flat panel storage panel from the package.

Dimensions of such a pouch or package are adapted to the dimensions of the screens or panels themselves: 25 cm×25 cm is an example of such a panel, so that, taking into account the thickness of the panel, a pouch of at least 30 cm×30 cm is desired for containing one panel. Other formats suitable for practical use are (in cm/cm): 15×30, 18×24, 18×43, 20×40, 24×30, 30×43, 35×35 and 35×43 for storage phosphor panels; 20×60, 30×40 and 30×90 for conventional blue intensifying screens and 15×40, 20×96, 24×24, 30×100, 30×30 and 40×40 for green intensifying screens, as well as 10×500 for non-destructive screens.

In a preferred embodiment the package as set forth is closed by thermosealing, at least when thermosealing the remaining (fourth) side, under inert gases like nitrogen or argon (i.a. blowing said inert gas into the pouch while performing sealing the pouch), or in the alternative under vacuum.

Besides being protected against oxygen and moisture, the thus packed screen or panel should be protected against oils and fatty acids as well as grease, thanks to the impermeability of the package according to the present invention.

In all embodiments of the packaging material a compartment for holding a desiccant may be present. Alternative humidity-controlling materials in form of a foil at each side of the storage phosphor panels and/or inbetween the surface of the panel may also be present, such as a water-absorbing resin as e.g. poly(sodium acrylate), dispersed on a film support coated with an adhesive binder such as a heat-meltable polymer and a latex, and then covered with a cloth, a film or paper in order to prepare a sheet having a high water-absorbing resin-containing layer as a core, followed by impregnating it with an aqueous salt solution, whereby the humidity-controlling material can be prepared. In this case a fungicide and a preservative may further be used together therewith.

More particularly preferred with respect to moisture the packed screen or panel according to the present invention is additionally provided with (packed or coated) silica gel as moisture absorbing agent. Said packed silica gel is preferably present inside the package together with the screens or panels.

In the same form an additional oxygen absorber may also be present besides the desiccant explained above, said absorber comprising e.g. iron powder, an oxidation accelerating agent and a filler. Therein the oxidation accelerating agent is preferably selected from the group consisting of a halogenated product of alkali metals or alkaline earth metals, a halogenated product of ion exchange resins, a hydrochloric acid, a hypochlorite, or mixtures thereof, whereas the filler is at least one substance selected from the group consisting of activated charcoal, potassium carbonate, pearlite, zeolite, activated alumina, oxidized iron, alkaline earth metal oxides and gypsum.

In still another embodiment the present invention relates to packed storage phosphor screens having a protection package for handling and storing products, in order to protect the screens or panels (besides moisture and oxygen) against static electrical discharge, shock, corrosion and contamination. In particular a multilayer protection pouch or bag for handling and storing one or more storage phosphor panel(s) comprising stimulable phosphors subject to possible damage due to shock, may contain in its interior part in contact with the thermoplastic inner layer a bubble pack layer, so that cushioning means disposed around at least portion of the packed screens or panels protect said screens or panels against (especially external) mechanical forces.

It is thus an essential feature to have a package having an impermeable layer composition in that the combination of at least an aluminum layer in contact with one heat-sealable thermoplastic layer as inner side of the package closer to the panel, that is air-tight in that it is, to a strongly limited extent, permeable by air at a temperature of 23° C. and a relative humidity of 75%, said air being composed of compounds selected from the group consisting of oxygen, nitrogen and carbon dioxide, in an amount of up to less than 0.01 ml per sq.m., per 24 hours and per bar each, determined following DIN 53 122, and by moisture in an amount of up to less than 0.01 g of water per sq.m. and per 24 hours, following DIN 53 380 (ISO 2556, ASTM D 1434).

In the search for alternatives to polyethylene film sheets, whether used as inner thermoplastic layer or as apart packing wrapper sheet for panels present in a package according to the present invention, various monolayer films, like polyvinyl chloride (PVC) films have been considered, but most of them are not as commercially acceptable and do not provide better performance. So high-density polyethylene (HDPE) is much too inelastic and lacking in heat sealability to be useful as a commercial wrap, while the various low density polyethylenes, e.g. low-density polyethylene (LDPE), linear low-density polyethylene (LLDPE), ultra low-density polyethylene (ULDPE), etc., do not possess sufficient elastic recovery, as the wrapper retains impressions or dents caused by handling of packaged screen panels.

The heat-sealable thermoplastic layer of the wrapper at the inside of the package is arranged in such a way that the wrapper may easily be peeled open, by rupturing a surface stratum only (an "easy peel resin coat") of said thermoplastic layer. In the mentioned way, one may dispense with the usual tear-strip for opening the package.

The layer of aluminum, having a thickness of less than 15 $\mu$m, more preferably in the range from 6–10 $\mu$m, is adhesively bound to the polymeric layer in the outermost direction on one side, and adhesively bound as well on the thermoplastic layer in the innermost direction at the other side.

In order to have a layer arrangement providing physical strength as well as permeability of gases (especially oxygen, carbon dioxide and nitrogen) to a limited extent as claimed, according to the present invention the outermost metallized polymer layer preferably is a (transparent) polypropylene layer. In principle thermoplastic polymers and copolymers based on p-xylylene and substituted p-xylylene monomers already mentioned above and known as preferred moisture resisting protective outermost layer of moisture-sensitive storage phosphor screens or panels can be coated on top of the outermost layer: in order to avoid too high a complexity and/or cost with respect to coating and composition such an additional outermost layer on top is not preferred, the more as moisture-resistant coatings present in the more internally situated layers. The thus preferred outermost transparent polypropylene layer preferably has a thickness of less than 25 μm. Thicknesses of adhesive layers present inbetween consecutive layers as set forth in the layer arrangement of the asymmetric packaging foil are in the range from 1 μm up to 5 μm. So the adhesive layer between polypropylene and aluminum or polyester and aluminum, coated at a thickness of less than 5 μm (preferably about 3 μm, therefor coating an amount of adhesive of less than 5 g per sq.m. and more preferably between 3.5 and 4.5 g per sq.m.), should provide an adhesive strength or force, determined as described in DIN 53 357, of at least 2.5 $N/mm^2$.

The adhesive strength between the aluminum layer and the polyethylene layer coated at about the same thickness in about the same amounts as described hereinbefore, should at least be more than 5.0 $N/mm^2$ (value for adhesive strengths measured as prescribed in DIN 53 357).

As an alternative in order to provide an oxygen barrier preferred transparent polymers are formed from unsubstituted ethylenically unsaturated hydrocarbons. These polymers include, without however being limited thereto, diene polymers such as polyisoprene, (e.g., transpolyisoprene), polybutadiene (especially 1,2-polybutadienes, which are defined as those polybutadienes possessing greater than or equal to 50% 1,2 microstructure), and copolymers thereof, e.g. styrene-butadiene. Such hydrocarbons also include polymeric compounds such as polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containing more than one carbon-carbon double bond (conjugated or non-conjugated). These hydrocarbons further include carotenoids such as β-carotene. Preferred substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from (meth) allyl (meth)acrylates. The composition used may also comprise a mixture of two or more of the substituted or unsubstituted ethylenically unsaturated hydrocarbons described above, provided that for the same thickness of the polymeric layers and of the adhesives between the said layers and aluminum, an adhesive strength as set forth above is guaranteed.

As the oxygen-scavenging outermost layer in the layer arrangement of the package of packed screens or panels according to this invention may be transparent, 1,2-polybutadiene can be used as component exhibiting transparency, mechanical properties and processing characteristics similar to those of polypropylene. In addition, this polymer is found to retain its transparency and mechanical integrity even after most or all of its oxygen capacity has been consumed, and even when little or no diluent resin is present. Further, 1,2-polybutadiene exhibits a relatively high oxygen capacity and, once it has begun to scavenge, it exhibits a relatively high scavenging rate as well. As an alternative in order to mimimize the transmission of oxygen the multi-layered package preferably comprises as an outermost layer, a layer comprising an ethylene polymer having siloxane cross-linking bonds. In another embodiment, the multi-layer film contains as outermost layer a layer of an ethylene vinyl acetate copolymer.

In a further embodiment of the present invention the package of the packed screen or panel according to the present invention is provided with an antistatic coating on at least one side of the (multilayered) foil. More preferably such an antistatic layer is provided on the inner thermoplastic polymer layer and/or the outer layers of the storage panels, as removal of the storage phosphor panels from the package may lead to charging/discharging phenomena of static electricity, although the aluminum foil is electroconductive and may reduce (in part) disadvantageous effects, depending on the environmental circumstances. More particularly in a "dry" atmosphere wherein a low relative humidity is measured, the problem may be stringent.

Moreover the aluminum layer forms a surface with a highly reflective power whereby absorption of IR radiation by the package and resultant heating of the contents is minimized.

In the optional embodiment wherein one or more antistatic layer(s) is(are) present onto the thermoplastic layer of the foil and/or on outer layers of the storage panels, it has to be recommended to make use of an antistatic agent or agents in the coated layer formulations in order to obtain the smallest possible tribo-electrical differences between the antistatic layer and the outer layers of the storage panels that are in direct contact with each other. So coating compositions comprising the same antistatic agent(s) may be applied both on the thermoplastic polymer layer and on (or in) the protective outer layer(s) of the storage phosphor panels. As antistatic agents water-soluble conductive polymers may be used having at least one conductive group selected from a sulphonic acid group, a sulphate-group, a phosphate-group, a quaternary ammonium salt group, a tertiary sulfonium salt group, a carboxyl group and a polyoxyethylene group. The conductive group may be linked directly to the polymer, through a divalent coupling group or to an aromatic, heterocyclic ring as e.g. a benzene ring or a pyridine ring. The conductive polymers may further include at least one of the group selected from styrene, vinylidene chloride, acrylic acid, methacrylic acid, itaconic acid, itaconic esters or butadiene. The most useful polymers for embodying the invention are generally those having an average molecular weight of about 10 to $10^6$. In the outer protective layers amounts of conductive polymer expressed in solid matter varying from 0.0001 to 10 $g/m^2$ may be added and, more preferably, from 0.001 to 1 $g/m^2$. Instead of or in addition to conductive polymers, the antistatic layers may comprise antistatic compounds. Especially preferred antistatic compounds are fluorinated compounds, in particular fluorinated surfactants, like e.g. perfluorocaprilic acid or its salts and hydrophilic polymers with polyoxyethylene units and a terminal fluorinated group. Preferred fluorinated compounds for use in packed storage screens assembly according to the present invention are those having a group with oxyethylene groups, represented by the formula RF-A-X, wherein RF stands for a partly or wholly fluorinated hydrocarbon chain comprising at least 3 fluorine atoms, A stands for a chemical bond, a bivalent hydrocarbon group including a bivalent hydrocarbon group interrupted by one or more heteroatoms, or the group —COO, —CON(R)—, —$SO_2$N(R)— or $SO_2$N(R)CO wherein R is hydrogen or alkyl comprising from 1 to 5 C-atoms, X stands for a hydrophilic oxyalkylene group containing one or more oxyethylene groups.

Further any of the generally known polyethylene oxide polymers may be useful as an antistatic agent: a preferred antistatic agent is a polyethylene oxide compound, represented as R—O—(CH$_2$CH$_2$O)$_n$—H in general, wherein n is an integer of at least 4 preferably between 8 and 30 and R represents a long chain alkyl or alkylaryl group having at least 10 C-atoms as e.g. oleyl. Different antistatic agents as described hereinbefore may be present as mixtures in the antistatic layer(s) in this invention, the mixtures being the same or different for the different antistatic layers. Antistatic layers may further contain a latex. Such latexes, if present, preferably contain an acrylate or a methacrylate component esterified with an alkyl group in the polymer molecules thereof. Examples of such latex components include e.g. methyl acrylate, ethyl acrylate, butyl acrylate, methyl methacrylate, ethyl methacrylate and butyl methacrylate.

Methods of coating packages described hereinbefore with at least one antistatic coating layer are well-known from the state-of-the-art. Said at least one antistatic coating may be applied to the heat sealable thermoplastic polymer for use as inner layer of the packed storage phosphor screen of the present invention by means of roller coating, slide-hopper coating, curtain coating, spray coating or, and preferably, by gravure printing. On top of the outer layers of the storage panels at least one antistatic layer may be applied e.g. by means of preferred spray coating techniques. Alternatively at least one antistatic agent may be added to said outer layers of the storage panels layer.

By making use of storage phosphor panels separately packed with a thermoplastic wrapper having an antistatic layer, wherein the storage panels and the thermoplastic wrapper are in intimate contact, the problems caused by static charges prior to use by removal of a storage panel out of its package material can be avoided or substantially reduced. In the alternative the wrapper described above, if present, may be covered or may have included therein an effective amount of a conductive compound lowering the lateral electrical resistance. A particular conductive compound suitable for use therein is a polythiophene compound. Said polythiophene compound, if present, is preferably incorporated in an antistatic layer(s) as an aqueous dispersion of a polythiophene compound/polymeric anion complex and in a preferred embodiment said polymeric anion is polystyrene sulphonate. The thus applied polythiophene conductive compound providing ability to reduce a lateral electrical resistance up to a level of less than $10^{11}$ Ohm per square preferably is polyethylene dioxythiophene (PEDT). In the alternative the said conductive compound is a member chosen from the group consisting of tin oxide, indium tin oxide, and vanadium oxide or a member chosen from the group consisting of polyaniline, a tetracyanoquinone (TCNQ) complex, a quaternary ammonium compound, and a sulphonated compound. In a preferred embodiment said compound or said mixture of compounds is, or comprises a perfluorinated surfactant, wherein the layer pack of the packaging materials comprises an adhesive layer and a rigid polymeric resin, expressed in an alternative way as comprising a coated soft polymeric layer and a coated hard polymeric layer. Polymeric layer(s) may, besides an antistatic layer as explained above, further contain a matting agent in order to avoid undesired slidability, in favor of manutention. As a matting agent, PMMA is preferred. In a further particular embodiment, said antistatic layer(s) further contain(s) an anti-scratch agent. In a preferred embodiment said anti-scratch agent is a polysiloxane-polyether copolymer.

The polymers and compounds described above for use in the packed storage panels according to the present invention, as a particular advantage, show excellent protection of the storage panels, more particularly with respect to resistivity against solvents and external atmospheric influences like moisture and oxygen permeability, comparable with materials like glass and ceramic materials. The manutention of such a package is a further advantage, as it is superior with respect to the mentioned materials as well as with respect to e.g. polyacetylene or polypyrrol polymers.

The packed storage phosphor panels according to the present invention further normally bear information readable by optoelectronic devices. Such device may be present on the packaging itself or the packaging may include a transparent part—like a window—covering the said information. Said information may be present in form of a bar code, a chip or a label without however being limited thereto.

Within the scope of the present invention a binderless photostimulable phosphor screen to be packed is, in a preferred embodiment, without however being limited thereto, overcoated with a protective layer comprising besides moieties carrying fluor-atoms, polymeric beads, optionally a nanocrystalline dye compound or a combination thereof.

In order to provide an image storage panel having high surface durability, i.a. avoiding damaging of the surface by stain and abrasion after multiple use, further in favor of ease of manipulation, excellent image quality (improved sharpness) without screen structure noise increase the radiation image storage panel comprises a protective coating characterized in that, besides a binder, the said protective coating comprises a white pigment having a refractive index of more than 1.6, more preferably a refractive index of more than 2.0, and even more defined, titanium dioxide, which is present in the said binder, optionally further comprising a urethane acrylate, and wherein said protective coating has a surface roughness (Rz) between 2 µm and 10 µm as disclosed in EP-A 1 318 525.

In the alternative the protective layer is composed of a polymeric compound selected from the group consisting of vinyl resins comprising moieties derived from esters of acrylic acid and vinyl resins comprising moieties derived from esters of methacrylic acid and, even more preferably, a thermoplastic rubber as disclosed in EP-Application No. 02 100 235, filed Mar. 8, 2002. In favor of sharpness the polymer further comprises at least one colorant, and more preferably, a colorant having same absorption characteristics with respect to stimulating radiation as the colorant deposited by chemical vapor deposition as described above.

As an outermost layer, a parylene layer is highly desired as moisture proof layer as has e.g. been described in EP-A's 1 286 362 and 1 286 365. In still another embodiment according to the present invention a binderless photostimulable phosphor screen is provided, overcoated with a vacuum deposited protective layer of poly(p-xylylene) (=parylene), poly(p-2-chloro-xylylene), poly(p-2,6-dichloroxylylene) and fluoro substituted poly(p-xylylene), MgF$_2$, or a combination thereof. As chemical vapor deposition is a technique that can be applied when making use of those components, the said technique is advantageously applied in this case. "Parylene" thereby particularly provides excellent moisture resistance, whereas MgF$_2$ offers excellent anti-reflecting properties.

The screen or the panel of the present invention can also have reinforced edges as described in, e.g., U.S. Pat. No. 5,334,842 and U.S. Pat. No. 5,340,661.

The present invention, in a particularly preferred embodiment, moreover includes a binderless phosphor panel.

The storage phosphor used in that panel or screen is preferably an alkali metal storage phosphor. Such a phosphor is disclosed e.g. in U.S. Pat. No. 5,736,069 and corresponds to the formula:

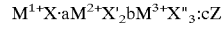

wherein: $M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, Cl, I and $0 \leq a \leq 1$, $0 \leq b \leq 1$ and $0 < c \leq 0.2$.

An especially preferred phosphor for use in a panel or screen of the present invention is a CsX:Eu stimulable phosphor, wherein X represents a halide selected from the group consisting of Br and Cl, produced by a method comprising the steps of:

mixing said CsX with between $10^{-3}$ and 5 mol % of a Europium compound selected from the group consisting of EuOX', $EuX'_2$ and $EuX'_3$, X' being a member selected from the group consisting of F, Cl, Br and I;

firing said mixture at a temperature above 450° C.;

cooling said mixture and recovering the CsX:Eu phosphor.

Such a phosphor has been disclosed in EP-A-1 203 394.

The phosphor is preferably vacuum deposited on the support under conditions disclosed in EP-A-1 113 458 and EP-A-1 118 540.

Particular embodiments as described in EP-Applications Nos. 02100295, 02100296, 02100297 and 02100298, all four of them filed Mar. 26, 2002, may be applied as well as the particular embodiments described in EP-Applications Nos. 02100763, 02100764 and 02100765, all three of them filed Jun. 28, 2002.

A moisture-proof insulating film is thus preferably present on the phosphor layer, wherein said film is most preferably obtained by CVD (chemical vapor deposition) formed on the phosphor screen or panel. The phosphor screen or panel thus formed characterized by a moistureproof protective overcoat layer, preferably has that protective layer on part of the support having a surface larger than the main surface of said phosphor layer, so that the said phosphor layer leaves a portion of said support free, and said protective overcoat layer covers at least a part of said portion of said support left free by said phosphor layer. Said moistureproof protective overcoat layer normally is the outermost layer, covering the surface of the phosphor layer, wherein the said surface is smaller than the surface of the support so that the phosphor layer does not reach the edges of the support. A panel with a support having a surface larger than the main surface of the phosphor layer leaves a portion of the support free, whereas the moistureproof protective layer covers, at least in part, the portion of the support left free by the phosphor layer. An advantage of such a construction resides in the fact that the edges of the phosphor layer do not touch mechanical parts of the apparatus and are thus less easily damaged during use of the panel, more particularly e.g. during transport in a scanner. Another advantage of this construction is that no special edge reinforcement is necessary (although, if desired, further edge reinforcement may be applied). Such a construction of a phosphor panel wherein the surface of the phosphor layer is smaller than the surface of the support, so that the phosphor layer does not reach the edges of the support, represents a particularly preferred embodiment of the present invention, and such a construction can be beneficial for the manufacture of any phosphor panel covered with any protective layer known in the art. In such a phosphor panel the moistureproof protective layer normally has a thickness in the range between 0.05 μm and 15 μm, and even more preferably between 1 μm and 10 μm.

As suggested hereinbefore the moistureproof protective overcoat layer normally is the outermost layer of the panel but, in another embodiment, the said layer may be further overcoated with another outermost layer for further protection, e.g. against dust, scratches and damaging. In that case it is recommended to have a polymeric layer and, even more preferred a radiation cured polymeric layer as an outermost layer. When on such a phosphor layer with needle shaped phosphor crystals, separated by voids, a layer with very low water permeability is deposited as in the present invention, it is preferred that this layer is a chemical vacuum deposited parylene layer, while such a layer not only covers the surface of the needle crystals, but also covers the voids between the needles thus protecting the edges of the phosphor needles thoroughly against humidity.

To summarize and meanwhile expressed in another way a preferred package or blister totally encompassing one or more storage phosphor panel(s) within a thermoplastic bubble or blister comprised of two plastic foils which meet near their peripheries, in order to seal the product enclosed within, is thus provided, and ensures that nothing will escape from the product and that no moisture or oxygen (or at least to a limited extent as described above, following the corresponding DIN procedures) will come into the blister prior to opening the said blister, further ensuring that the objects of the present invention will perfectly be attained. Packed storage panels of the present invention are particularly suitable for resisting a plurality of adverse conditions such as oxygen and humidity (moisture), further including electrostatic discharge, corrosion, contamination and mechanical forces like shock, as well as elevated heat, without blistering, bubbling, cracking or any dust or oil permeation and are perfectly suitable for use in quite severe climate circumstances, being tropical as well as polar climates.

It is self-explaining that besides storage phosphor panels also luminescent intensifying screens can be packed in the package as described above and that such a packaging material is not restricted or limited to use for the applications as the particular ones set forth herein. According to the present invention use is also claimed of a sealed package for screens or panels and raw stock materials in order to prepare the said screens or panels, wherein said package is layered in form of an asymmetrical barrier layer foil, said foil comprising an inner flexible thermoplastic polymer layer and an outer polymer layer in adhesive contact with an aluminum layer situated inbetween said inner flexible thermoplastic polymer layer and said outer polymer layer, wherein said foil is characterized by adhesive forces, between said outer polymer layer and said aluminum layer, of more than 2.5 $N/mm^2$ following DIN 53 357, by a permeation to water vapor of less than 0.01 g per sq.m. in an environment having a temperature of 23° C. and a relative humidity of 75% RV for 24 hours following DIN 53 122, and by a permeation of less than 0.01 $cm^3$ per sq.m. per 24 hours and per bar for each of oxygen, carbon dioxide and nitrogen following DIN 53 380 (ISO 2556, ASTM D 1434), and wherein the said package further optionally has the desired or preferred options as described hereinbefore in the detailed description of the present invention.

Apart for screens or panels all raw stock materials, and, in particular the components required in order to prepare the phosphors themselves, inclusive for the phosphors themselves, are also envisaged in order to be preserved in severe conditions of temperature and humidity over a long time period (from some days up to several months and even some years).

The following examples illustrate the present invention without however limiting it thereto.

EXAMPLES

While the present invention will hereinafter be described in connection with preferred embodiments thereof, it will be understood that it is not intended to limit the invention to those embodiments.

Layer Built-up of the Package for the Storage Phosphor Panels

The asymmetric protective barrier-foil, illustrated in FIG. 1, was built-up as follows (starting from the side for use as outermost layer of the packed storage phosphor panels):
1. Metallized transparent polypropylene; 21 μm thick;
2. Adhesive layer, coated at 4 g/m²; 3 μm thick;
3. Aluminum layer; 7 μm thick;
4. Adhesive layer, coated at 4 g/m²; 3 μm thick;
5. White opaque polyethylene layer (70% LLDPE/30% LDPE); 75 μm.

An adhesive strength, expressed in N/mm² was measured:
between 1 and 3, determined as specified in DIN53 357: 3,1 N
between 5 and 3, determined as specified in DIN53 357: 5.9 N The asymmetric barrier layer was cut into 2 squares having a dimension of 30 cm×30 cm. The inner thermoplastic polyethylene layers were put in contact with each other and the polyethylene layers were heat-sealed at 3 common sides in order to have a heat-sealed region with a width of about 1 cm.

After having completely inserted the exemplified storage phosphor screen described above into the thus created pouch or bag, the fourth side was heat sealed under addition of an inert gas: the internal atmosphere of the bag, between the storage phosphor panel surfaces and the inner polyethylene foil was flushed with argon before hermetically closing the package.

A storage phosphor screen was thus prepared for further packaging experiments.

Example 1

Composition of the Phosphor Screens Antihalation Undercoat Layer:

| Solution A: | |
|---|---|
| MOWILITH CT5 (from HOECHST AG) | 300 g |
| Ethanol | 700 g |
| CYMEL 300 | 60 g |
| p-toluene sulphonic acid | 12 g |
| Solution B*: | |
| Tiarymethane Dye-1 | 0.750 g |
| Ethanol | 150 g |
| Sodium hydroxide | 0.08 g |

*16 hours after its preparation solution B is filtered off: a red-brown solution is obtained.

16 hours after its preparation solution B is filtered off: a red-brown solution is obtained.

| Coating solution: | |
|---|---|
| Solution A | 33.3 g |
| Solution B | 3.0 g |
| Ethanol | 63.6 g |

The coating solution was coated by dipcoating techniques at a rate of 4 m per minute on a polyethylene terephthalate support (see further Table 1) having reflecting properties (containing $BaSO_4$ particles) or absorbing properties (having carbon black particles).

Thermal curing was performed over one night at 80° C. after drying.

Properties of the thus Obtained Aantihalation Layer.

An absorption of 0.22 at a wavelength of 633 nm (HeNe laser emission wavelength). No substantial absorption is measured at the emission wavelength of the stimulable phosphor (having its maximum emission at 390 nm).

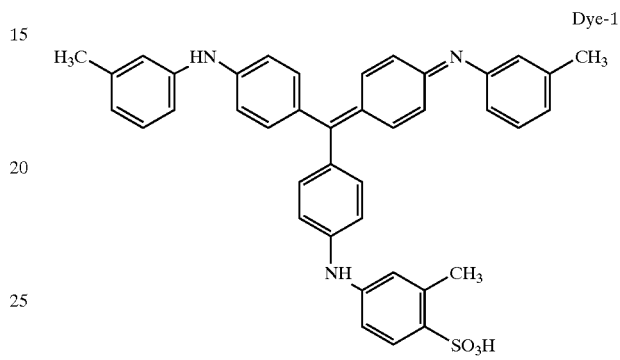

Dye-1

| Phosphor layer composition: | |
|---|---|
| BAEROSTAB M36 (from Bärlöcher GmbH) | 1.5 g |
| DISPERSE AYD 9100 (from Daniel Produkts Company) | 0.75 g |
| KRATON FG19101X (from Shell Chemicals) | 12.5 g |
| BaSrFBr: Eu (mean particle size: 7 μm) | 270 g |
| BaSrFBr: Eu (mean particle size: 3 μm) | 30 g |

Preparation of the phosphor laquer composition:

BAEROSTAB M36, DISPERSE AYD 9100 and KRATON FG19101X were dissolved while stirring in the prescribed amounts in 61.5 g of a solvent mixture from wash benzine 100–120, toluene and butyl acrylate in ratios by volume of 50:30:20. The phosphors were added thereafter and stirring was further proceeded for another 10 minutes at a rate of 1700 r.p.m.

The composition was doctor blade coated at a coating rate of 2.5 m per minute onto a subbed 175 μm thick polyethylene terephthalate support and dried at room temperature during 30 minutes. In order to remove volatile solvents as much as possible the coated phosphor plate was dried at 90° C. in a drying stove.

It has been established that a layer composition was obtained having good curable properties. Moreover no diffusion of colorant was found from the intermediate antihalation layer between support and phosphor layer to the phosphor layer: this particular dye is advantageously soluble in ethanol but insoluble in solvents present in the coating composition of the phosphor layer.

Measurement of sensitivity S and square wave response SWR for stimulable phosphor screens For the photostimulable phosphor screens coated with $BaSrFBr:Eu^{2+}$ phosphor the measurement of S and SWR was carried out with an image scanner made up with a He-Ne laser. The beam of a 30 mW red He—Ne laser was focussed to a small spot of 114 μm (FMWH) with an optic containing a beam expander and a collimating lens. A mirror galvanometer was used to scan this small laserspot over the entire width of a phosphor sample. During this scanning procedure the phosphor was stimulated and the emission light was captured by an array of optical fibers which were sited on one line. At the other end of the optical fibers being mounted in a circle a photomultiplier was situated.

In order to attenuate the stimulating light an optical filter, type BG3 from SCOTT, was placed between the fiber and the photomultiplier. In this way only the light emitted by the phosphor was measured. The small current of the photomultiplier was first amplified with an I/V convertor and digitalized with an A/D convertor.

The measuring set up was connected with a HP 9826 computer and a HP 6944 multiprogrammer to controll the measurement. Starting the procedure an electronic shutter was closed to shut down the laser. A phosphor sample measuring 50 mm×210 mm was excited with a 80 kV X-ray source provided with an aluminum filter having a thickness of 12 mm. The radiation dose was measured with a FARMER dosemeter. Between the X-ray source and the phosphor layer a thin lead-raster containing 7 different spatial frequencies was mounted in order to modulate the X-ray radiation. Frequencies used were 0.025, 0.50, 1.00, 2.00, 3.00, 4.00 and 5.00 line pairs per mm. After exposure the sample was put into the laser scanner. In order to read out one line the shutter was opened and the galvanometer was moved linearly. During the scanning procedure the emitted light was measured continuously with the A/D convertor at a sampling rate frequency of 100 kHz and stored within a memory card in the multiprogrammer. After scanning one line the plate was moved over a distance of 114 $\mu$m and the next line was read. Once the scan was complete the shutter was closed again and the galvanometer was put on his original position again.

The various scan lines were transferred from the memory card in the multiprogrammer to the computer where said data were analysed. A first correction took into account the sensitivity variation of the scan line with the distance. Therefore a calibration scan was measured previously for a phosphor sample that was perfectly homogeneously exposed. A second correction took into account the amount of X-ray dose by dividing said values by the said dose amount.

The different blocks in the line scan of the grating were separated and the amplitude on each spatial frequency was calculated, making use of Fourier analysis. The amplitude of the first block having a spatial frequency of 0.025 line pairs per mm was taken as the zero frequency amplitude and was used to normalize the amplitudes for all frequencies for the grating. These normalized results are the Square Wave Response (SWR: SWR1 referring to the response at 1 line pair per mm; SWR2 to the response at 2 line pairs per mm) which was representative for the resolution of the screen.

Apart from those measurements the erasability of the storage phosphor screens was performed: therefore the screens were homogeneously irradiated with a dose of ca. 50 mR at 80 kvp (10 mm Al filter). The screen were read out in a flying spot scanner. The scanning light source was a 30 mW diode laser emitting at 690 nm. A 4 mm Hoya BG-39 (trade name) filter was used to separate the stimulation light from the light emitted by the phosphor screen. The scan-average levels (SAL) were determined as the average signal output of the scanning device for a selected line after application of a high pass filter set to 0.1. The results of this measurement were noted as a SAL value for the different screen samples.

In Table 1 data measured with respect to screen speed and sharpness have been combined and have been expressed in relative units, wherein the reference storage panel(see EX1) has been set at a value of "100". Samples thereof have been preserved in conditions of temperature (in 0° C.) and relative humidity (in %) during several days as indicated in the Table 1.

All of those panels have been tested without any protection.

TABLE 1

| | Sample No. | Number of days | ° C. | % RH | Relative Quality |
|---|---|---|---|---|---|
| Temp. (° C.) | | | | | |
| EX1 | 7453/5 | 0 | | | 100 |
| EX2 | 7504/6 | 24 | 30 | 100 | 95 |
| EX3 | 7504/7 | 24 | 45 | 100 | 94 |
| EX4 | 7504/5 | 24 | 60 | 100 | 86 |
| Time | | | | | |
| EX1 | 7453/5 | 0 | | | 100 |
| EX5 | 7504/2 | 6 | 60 | 100 | 94 |
| EX6 | 7504/4 | 12 | 60 | 100 | 94 |
| EX7 | 7504/5 | 18 | 60 | 100 | 91 |
| EX4 | 7504/5 | 24 | 60 | 100 | 86 |

As can be concluded from figures summarized in the Table 1 above the relative quality figure is indicative for strong losses that are increasing with time (days) and temperature for a saturated relative humidity, set at 100%.

Example 2

Storage phosphor screens have been prepared in the same way as in Example 1. In Table 2 data measured with respect to screen speed and sharpness have again been combined and have again been expressed in relative units, wherein the reference storage panel (see EX8) has been set at a value of "100". Samples thereof have been preserved in severe conditions of temperature (in 0° C.) and relative humidity (in %) during several days as indicated in the Table 2. The reference panel again has been tested without any protection, whereas the other panels (see Sample No. 7984/3 and 7984/5) having same composition have been tested without any protection.

Figure 2:
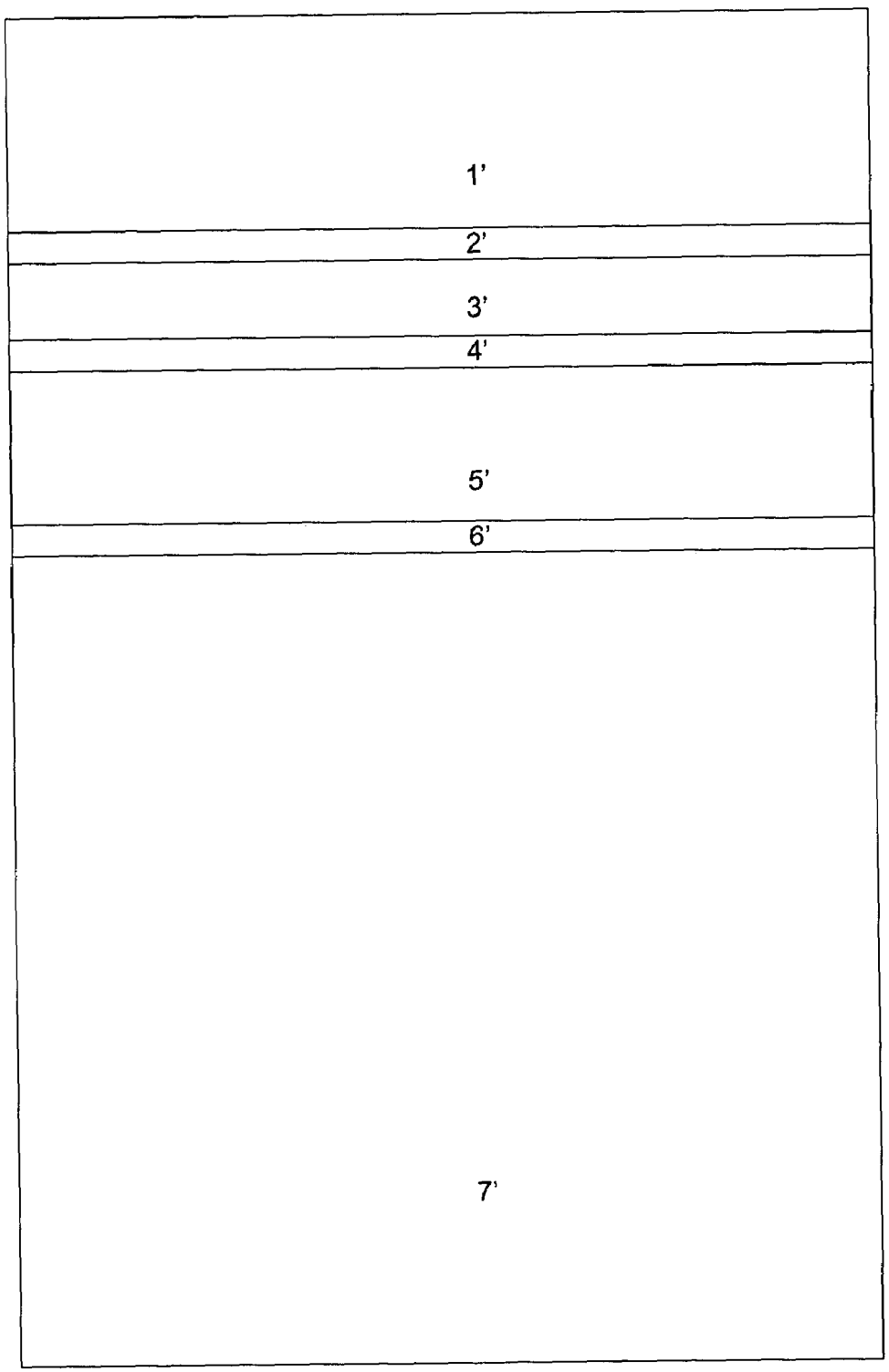
FIG. 2 shows another layer arrangement of a protecting package foil wherein numbers of the consecutive layers in FIG. 2 are corresponding with
a polyester layer (1');
an adhesive layer (2');
an aluminum layer (3');
an adhesive layer (4');
a stretched polyamide layer (5');
an adhesive layer (6');
a colorless polyethylene layer (7').

The "Type 2" pouch is differing from the "Type 1" pouch (see last column of the Table 2; "Type 1" referring to the layer arrangement as set forth in the FIG. 1) in following aspects (see therefor FIG. 2 with following description of the asymmetric foil (starting from the side for use as outermost layer of the packed storage phosphor panels):

1'. A polyester layer having a thickness of 12 $\mu$m;
2'. Adhesive layer, 3 $\mu$m thick;
3'. An aluminum layer having a thickness of 9 $\mu$m;
4'. Adhesive layer, 3 $\mu$m thick;
5'. A stretched polyamide layer, thickness 15 $\mu$m;
6'. Adhesive layer, 3 $\mu$m thick;
7'. A colorless low density polyethylene layer(LDPE), 80 $\mu$m thick.

As can be concluded from the results summarized in the Table 2 hereinafter, a polyethylene pouch closed by means of a tape, thereby sticking the said polyethylene pouch (EX10) makes quality decrease up to a lesser extent, if compared with the quality in the absence of any protection (EX9) in such severe conditions. Opposite thereto an unambiguous improvement has been observed if EX10 and EX11 are compared with each other.

It has further been observed that when taking out a storage panel from a packaging pouch without aluminum, having been preserved at saturated relative humidity (100%), that this storage phosphor panel was clearly covered with water drops. When stored in a pouch having aluminum no water drops were observed.

TABLE 2

| Sample No. | | Number of days | °C. | RH (%) | Rel | Remark |
|---|---|---|---|---|---|---|
| EX8 | | Reference | 0 | | | 100 |
| EX9 | 7984/3 | No packaging | 28 | 60 | 100 | 60 |
| | 7984/5 | No packaging | 56 | 60 | 100 | 60 |
| EX10 | 7984/0 | Sticked PE pouch | 28 | 60 | 100 | 76 |
| EX11 | 7984/1 | Al pouch + sealing | 28 | 60 | 100 | 90 | Pouch Type 1 |
| | 7984/2 | Al pouch + sealing | 28 | 60 | 100 | 92 | Pouch Type 2 |
| | 7984/4 | Al pouch + sealing | 56 | 60 | 100 | 83 | Pouch Type 1 |

Apart for storing phosphor screens or panels (storage phosphor panels as well as intensifying luminescent panels) as in the present invention, it is clear that raw materials (all "building blocks" of the screen, and more preferably starting materials for the preparation of the phosphors as well as the phosphors themselves in powdered form) as such are advantageously preserved in a package according to the present invention. For the storage phosphor panels as set forth a better reproducibility, a better intrinsic quality and a better erasability is attainable.

Having described in detail preferred embodiments of the current invention, it will now be apparent to those skilled in the art that numerous modifications can be made therein without departing from the scope of the invention, which should therefore be determined not with reference to the above description, but should instead be determined with reference to the appended claims, along with the full scope of equivalents to which such claims are entitled:

What is claimed is:

1. A packed phosphor screen or panel comprising of at least one screen or panel, packed apart in a wrapper foil, and a sealed package, wherein said package is layered in form of an asymmetrical barrier layer foil, said foil comprising an inner flexible thermoplastic polymer layer and an outer polymer layer in adhesive contact with an aluminum layer situated inbetween said inner flexible thermoplastic polymer layer and said outer polymer layer, wherein said foil is characterized by adhesive forces, between said outer polymer layer and said aluminum layer, of more than 2.5 N/mm$^2$ following DIN 53 357, by a permeation to water vapor of less than 0.01 g per sq.m. in an environment having a temperature of 23° C. and a relative humidity of 75% RV for 24 hours following DIN 53 122, and by a permeation of less than 0.01 cm$^3$ per sq.m. per 24 hours and per bar for each of oxygen, carbon dioxide and nitrogen following DIN 53 380.

2. Packed screen or panel according to claim 1, wherein another polymer layer inbetween said aluminum layer and said inner flexible thermoplastic polymer layer is present.

3. Packed screen or panel according to claim 2, wherein said outer polymer layer is a metallized polymer layer or a polyester layer.

4. Packed screen or panel according to claim 3, wherein said metallized polymer layer is a polypropylene layer.

5. Packed screen or panel according to claim 4, wherein said inner flexible thermoplastic polymer layer is composed of low density polyethylene.

6. Packed screen or panel according to claim 5, wherein at least one screen or panel is present, packed apart in a polymeric sheet wrapper.

7. Packed screen or panel according to claim 4, wherein at least one screen or panel is present, packed apart in a polymeric sheet wrapper.

8. Packed screen or panel according to claim 4, wherein packed silica gel is present as moisture absorbing agent.

9. Packed screen or panel according to claim 4, wherein said package has at least three thermosealed sides.

10. Packed screen or panel according to claim 9, wherein at least one of said thermosealed sides has a notch at its rim.

11. Packed screen or panel according to claim 4, wherein said package has at least one resealable side.

12. Packed screen or panel according to claim 4, wherein said package is provided with an antistatic coating on at least one side of the said foil.

13. Packed screen or panel according to claim 3, wherein said inner flexible thermoplastic polymer layer is composed of low density polyethylene.

14. Packed screen or panel according to claim 13, wherein at least one screen or panel is present, packed apart in a polymeric sheet wrapper.

15. Packed screen or panel according to claim 3, wherein at least one screen or panel is present, packed apart in a polymeric sheet wrapper.

16. Packed screen or panel according to claim 3, wherein packed silica gel is present as moisture absorbing agent.

17. Packed screen or panel according to claim 3, wherein said package has at least three thermosealed sides.

18. Packed screen or panel according to claim 17, wherein at least one of said thermosealed sides has a notch at its rim.

19. Packed screen or panel according to claim 3, wherein said package has at least one resealable side.

20. Packed screen or panel according to claim 3, wherein said package is provided with an antistatic coating on at least one side of the said foil.

21. Packed screen or panel according to claim 2, wherein said inner flexible thermoplastic polymer layer is composed of low density polyethylene.

22. Packed screen or panel according to claim 21, wherein at least one screen or panel is present, packed apart in a polymeric sheet wrapper.

23. Packed screen or panel according to claim 2, wherein at least one screen or panel is present, optionally packed apart in a polymeric sheet wrapper.

24. Packed screen or panel according to claim 2, wherein packed silica gel is present as moisture absorbing agent.

25. Packed screen or panel according to claim 2, wherein said package has at least three thermosealed sides.

26. Packed screen or panel according to claim 25, wherein at least one of said thermosealed sides has a notch at its rim.

27. Packed screen or panel according to claim 2, wherein said package has at least one resealable side.

28. Packed screen or panel according to claim 2, wherein said package is provided with an antistatic coating on at least one side of the said foil.

29. Packed screen or panel according to claim 1, wherein said outer polymer layer is a metallized polymer layer or a polyester layer.

30. Packed screen or panel according to claim 29, wherein said metallized polymer layer is a polypropylene layer.

31. Packed screen or panel according to claim 30, wherein said inner flexible thermoplastic polymer layer is composed of low density polyethylene.

32. Packed screen or panel according to claim 31, wherein at least one screen or panel is present, packed apart in a polymeric sheet wrapper.

33. Packed screen or panel according to claim 30, wherein at least one screen or panel is present, packed apart in a polymeric sheet wrapper.

34. Packed screen or panel according to claim 30, wherein packed silica gel is present as moisture absorbing agent.

35. Packed screen or panel according to claim 30, wherein said package has at least three thermosealed sides.

36. Packed screen or panel according to claim 35, wherein at least one of said thermosealed sides has a notch at its rim.

37. Packed screen or panel according to claim 30, wherein said package has at least one resealable side.

38. Packed screen or panel according to claim 30, wherein said package is provided with an antistatic coating on at least one side of the said foil.

39. Packed screen or panel according to claim 29, wherein said inner flexible thermoplastic polymer layer is composed of low density polyethylene.

40. Packed screen or panel according to claim 39, wherein at least one screen or panel is present, packed apart in a polymeric sheet wrapper.

41. Packed screen or panel according to claim 29, wherein at least one screen or panel is present, packed apart in a polymeric sheet wrapper.

42. Packed screen or panel according to claim 29, wherein packed silica gel is present as moisture absorbing agent.

43. Packed screen or panel according to claim 29, wherein said package has at least three thermosealed sides.

44. Packed screen or panel according to claim 43, wherein at least one of said thermosealed sides has a notch at its rim.

45. Packed screen or panel according to claim 29, wherein said package has at least one resealable side.

46. Packed screen or panel according to claim 29, wherein said package is provided with an antistatic coating on at least one side of the said foil.

47. Packed screen or panel according to claim 1, wherein said inner flexible thermoplastic polymer layer is composed of low density polyethylene.

48. Packed screen or panel according to claim 47, wherein at least one screen or panel is present, packed apart in a polymeric sheet wrapper.

49. Packed screen or panel according to claim 1, wherein at least one screen or panel is present, packed apart in a polymeric sheet wrapper.

50. Packed screen or panel according to claim 1, wherein packed silica gel is present as moisture absorbing agent.

51. Packed screen or panel according to claim 1, wherein said package has at least three thermosealed sides.

52. Packed screen or panel according to claim 51, wherein at least one of said thermosealed sides has a notch at its rim.

53. Packed screen or panel according to claim 1, wherein said package has at least one resealable side.

54. Packed screen or panel according to claim 1, wherein said package is provided with an antistatic coating on at least one side of the said foil.

55. Use of a sealed package for screens or panels and for raw stock materials in order to prepare the said screens or panels, wherein said package is layered in form of an asymmetrical barrier layer foil, said foil comprising an inner flexible thermoplastic polymer layer and an outer polymer layer in adhesive contact with an aluminum layer situated inbetween said inner flexible thermoplastic polymer layer and said outer polymer layer, wherein said foil is characterized by adhesive forces, between said outer polymer layer and said aluminum layer, of more than 2.5 N/mm$^2$ following DIN 53 357, by a permeation to water vapor of less than 0.01 g per sq.m. in an environment having a temperature of 23° C. and a relative humidity of 75% RV for 24 hours following DIN 53 122, and by a permeation of less than 0.01 cm$^3$ per sq.m. per 24 hours and per bar for each of oxygen, carbon dioxide and nitrogen following DIN 53 380.

\* \* \* \* \*